United States Patent
Frasch et al.

(10) Patent No.: US 8,281,684 B2
(45) Date of Patent: Oct. 9, 2012

(54) STEERING COLUMN ARRANGEMENT FOR A MOTOR VEHICLE

(75) Inventors: Wilhelm Frasch, Oberboihingen (DE); Norbert Schote, Ammerbuch (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 1154 days.

(21) Appl. No.: 12/138,365

(22) Filed: Jun. 12, 2008

(65) Prior Publication Data

US 2008/0314188 A1 Dec. 25, 2008

(30) Foreign Application Priority Data

Jun. 22, 2007 (DE) .......................... 10 2007 028 770

(51) Int. Cl.
*B62D 1/00* (2006.01)
(52) U.S. Cl. .......................... 74/494; 280/777
(58) Field of Classification Search .................. 74/492, 74/493, 494, 495; 280/775, 777
See application file for complete search history.

(56) References Cited

U.S. PATENT DOCUMENTS

| | | | |
|---|---|---|---|
| 3,998,468 A | | 12/1976 | Stegmaier |
| 4,060,010 A | * | 11/1977 | Heden ............................ 475/183 |
| 4,880,084 A | * | 11/1989 | Tanaka et al. ................... 188/67 |
| 5,562,306 A | * | 10/1996 | Rispeter ........................ 280/775 |
| 6,145,394 A | * | 11/2000 | Sferco ............................. 74/52 |
| 6,151,980 A | * | 11/2000 | Nishitani et al. ............. 74/484 R |
| 6,234,039 B1 | * | 5/2001 | Garnault et al. ................ 74/492 |
| 7,077,027 B2 | * | 7/2006 | Krizan et al. ................... 74/493 |
| 7,364,198 B2 | * | 4/2008 | Peppler .......................... 280/775 |
| 7,566,282 B2 | * | 7/2009 | Arbanas .......................... 475/19 |
| 8,117,940 B2 | * | 2/2012 | Andersson et al. .............. 74/493 |
| 2003/0000265 A1 | * | 1/2003 | Fuchs et al. ...................... 70/186 |
| 2005/0046554 A1 | * | 3/2005 | Atthaprasith ............... 340/426.1 |
| 2006/0169524 A1 | * | 8/2006 | Born et al. ..................... 180/444 |
| 2006/0290115 A1 | * | 12/2006 | Bannon .......................... 280/735 |
| 2007/0252372 A1 | * | 11/2007 | Spano et al. .................... 280/775 |
| 2008/0100050 A1 | * | 5/2008 | Menjak et al. ................. 280/777 |
| 2008/0185830 A1 | * | 8/2008 | Ridgway et al. .............. 280/777 |
| 2008/0272582 A1 | * | 11/2008 | Higashi et al. ................. 280/777 |

FOREIGN PATENT DOCUMENTS

| | | |
|---|---|---|
| DE | 23 59 943 A1 | 6/1975 |
| DE | 695 01 839 T2 | 8/1998 |
| DE | 199 62 587 A1 | 7/2001 |

OTHER PUBLICATIONS

German Search Report dated Apr. 21, 2008 including English translation of the pertinent portion (Nine (9) pages).

* cited by examiner

*Primary Examiner* — Justin Krause
*Assistant Examiner* — Gregory Prather
(74) *Attorney, Agent, or Firm* — Gerald E. Hespos; Michael J. Porco

(57) ABSTRACT

A steering column arrangement includes a steering spindle, which rotates about its longitudinal axis and serves to transfer a torque, generated by a steering wheel, to a steering gear, and a blocking device, which prevents the rotational motion of the steering spindle, especially in the event of a collision. The blocking device includes a stator, which is stationary in relation to the rotational motion of the steering spindle, and against which a blocking element is mounted in a relatively moveable manner. To prevent, in a reliable manner, an undesired twisting of the steering wheel, especially in the event of a collision, the blocking element is moveable into a locked position in a radial direction toward the steering spindle.

15 Claims, 3 Drawing Sheets

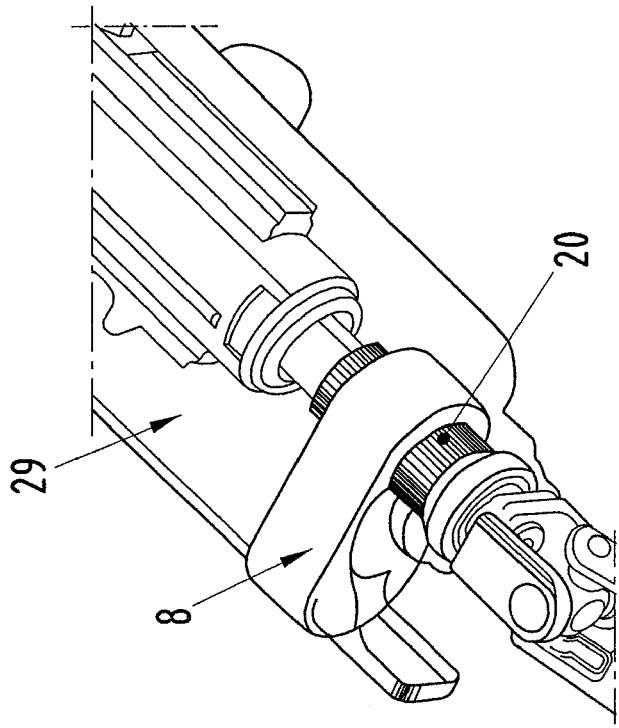
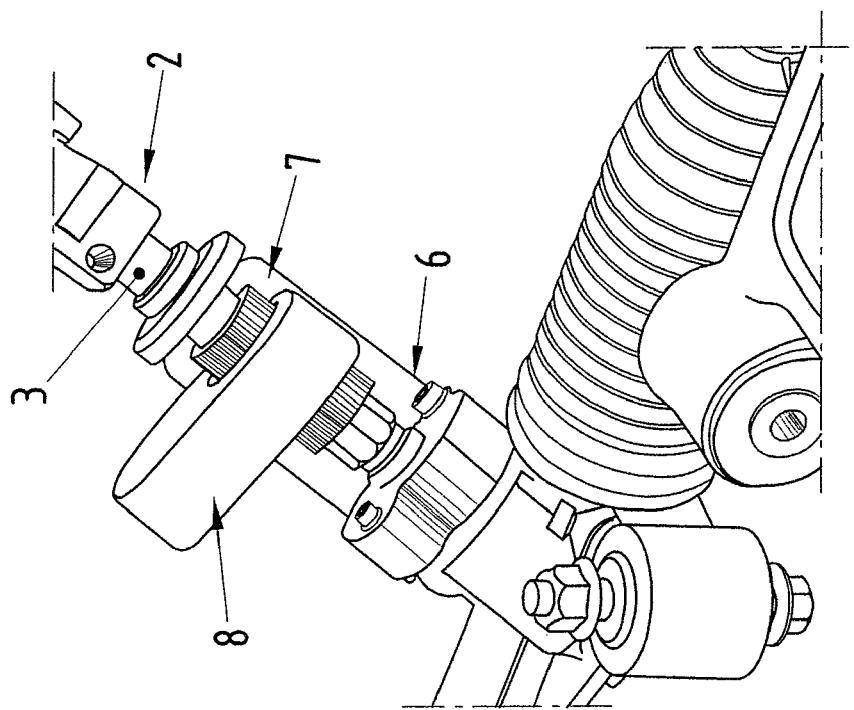
Fig. 4
Fig. 5

STEERING COLUMN ARRANGEMENT FOR A MOTOR VEHICLE

CROSS-REFERENCE TO RELATED APPLICATION

This application claims the priority of German Application No. 10 2007 028 770.6, filed Jun. 22, 2007, the disclosure of which is expressly incorporated by reference herein.

BACKGROUND AND SUMMARY OF THE INVENTION

The invention relates to a steering column arrangement for a motor vehicle and, in particular, to a steering column arrangement having a steering spindle and a blocking device against which a blocking element is mounted in a relatively moveable manner.

It is known from the mass production of motor vehicles that during a front end collision the forces act on the front wheels, a state that under some circumstances causes the introduction of an undesired rotational motion in the steering wheel by way of the tie rod and the steering linkage.

The German published patent application DT 2359943 A1 describes a measure in order to eliminate the so-called "wobble" movement of the steering wheel. To this end, the parts of the front section of the vehicle are constructed in such a manner that if, owing to a front end collision, the front section of the motor vehicle is displaced in the direction of the passenger compartment, the parts of the front end section act on the parts of the steering linkage in the sense of blocking the steering. Therefore, the front cross support has blocking elements in the form of guide elements, which slide over the steering pitman arm in the event of a collision. Thus, the steering is blocked, and the rotational motion, acting on the steering wheel, is eliminated.

A prerequisite for this type of blocking is that the front section of the vehicle shifts uniformly in the direction of the passenger compartment. Thus, for example, in the event of a front end collision, blocking may be guaranteed under some circumstances only with additional measures.

The object of the invention is to provide a steering column arrangement, which functions reliably with minimum complexity even in the event of a front end collision.

According to the invention, a steering column arrangement for a motor vehicle is provided with a steering spindle, which rotates about its longitudinal axis and serves to transfer a torque, generated by the steering wheel, to a steering gear. Furthermore, the invention provides a blocking device, which prevents the rotational motion of the steering spindle, especially in the event of a collision. To this end, the blocking device includes a stator, which is stationary in relation to the rotational motion of the steering spindle. A blocking element is moveable against the stator into a locked position in a radial direction directly to the steering spindle. Advantageous embodiments are described and claimed herein.

Owing to the inventive arrangement of the blocking device, there is no need for a coupling to the steering gear in order to block the rotational movement of the steering wheel. There is no need to deform the front section in order to prevent an undesired rotational motion of the steering wheel. It suffices if, in the event of a detected impact, the blocking element is activated by way of a control unit, which is well-known. A stator is required—that is, a component, which is stationary in relation to the rotational movement to the steering spindle, such as a steering spindle housing or a bracket for coupling the steering column to the cockpit cross support. The blocking element is mounted in such a manner that it moves relative to the stator and can assume two positions: a locking position, in which the rotational movement of the steering spindle is eliminated, and an unlocked position—thus, a normal position—in which the steering spindle transfers the rotational movement, applied by the driver on the steering wheel, to the steering gear.

In order to achieve a blocking of the steering spindle and, thus, the steering wheel, the blocking element may interact in a shape-locked manner with the steering spindle in the locked position.

As an alternative, a friction-locked interaction is also contemplated.

The blocking device may also advantageously include a housing, which is also attached in a relatively moveable manner to the stator. Thus, the steering spindle may be attached to both the blocking element and the housing itself.

In a preferred embodiment, the blocking element is mounted in a displaceable manner in the housing. As an alternative, the blocking element may be hinged. The blocking element is then pivoted about this coupling point in the direction of the steering column, in order to bring the blocking element into the locked position.

If an overpressure is generated, for example, by use of a pyrotechnical device or by use of a compressed air source in an interior, adjacent on the back to the blocking element, the blocking element may be moved in the housing in the direction of the steering spindle. If the blocking element is activated early, the drive for the blocking element may also be replaced by other alternatives, such as a mechanical drive.

For the shape-locked engagement, the blocking element may exhibit on its face side, facing the steering spindle, an internal toothing, which engages with a toothed ring of the steering spindle in the locked position.

Another preferred embodiment consists of the fact that the housing is held under prestress in such a manner that it moves relative to the stator. Thus, in the event of a misfiring, the housing can move back again by itself into its normal position.

A higher blocking force may be achieved if an inner wall region of the housing that faces the steering spindle also exhibits an internal toothing, which in the locked position of the blocking element engages with the toothed ring of the steering spindle. In the locked position, the internal toothing of the housing and of the blocking element may enclose almost completely the toothed ring of the steering spindle.

The activation of the blocking element may ensue by means of a signal, which is generated by a signal generator in the event of an impending collision or following a collision. This signal generator may be, for example, a control unit of an airbag unit.

Other objects, advantages and novel features of the present invention will become apparent from the following detailed description when considered in conjunction with the accompanying drawings.

BRIEF DESCRIPTION OF THE DRAWINGS

FIG. 4 depicts an inventive blocking device in a first possible installation position; and FIG. 5 depicts a blocking device in a second possible installation position.

DETAILED DESCRIPTION OF THE DRAWINGS

Figure 1:
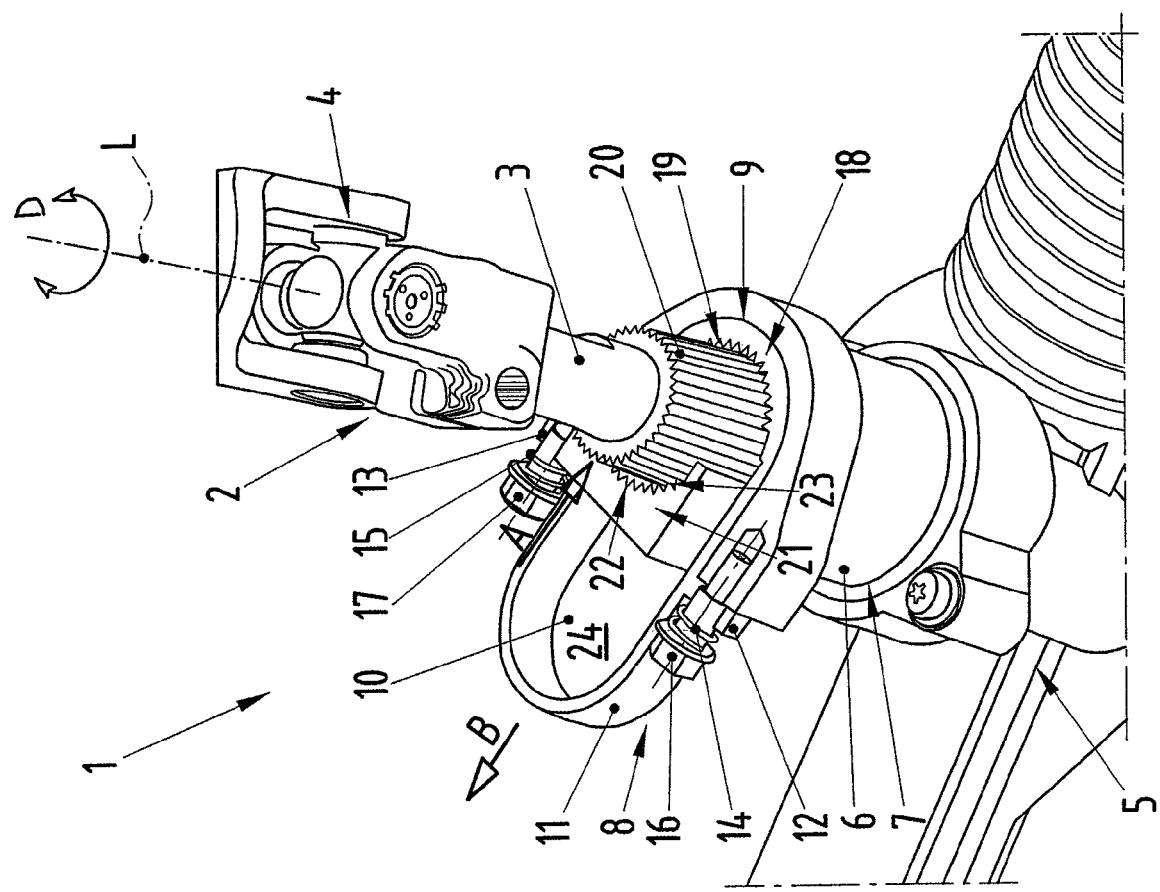
FIG. 1 is a perspective view of a steering column arrangement with a blocking device.

FIG. 1 depicts a steering column arrangement 1 with a steering spindle 2, which rotates about its longitudinal axis L in the direction of the arrow D. The steering spindle 2 includes a bottom steering spindle section 3, the upper end of which is connected by way of a universal joint 4 to additional steering spindle sections (not illustrated here) and then, finally, to the steering wheel (not shown).

The bottom end of the steering spindle section 3 is attached to the steering gear 5, which is not illustrated in detail. The steering spindle section 3 is jacketed by a housing 6, which is stationary in relation to the rotational movement D of the steering spindle 2 and which is referred to below as the stator 7.

Integrated into the stator 7 is a blocking device 8, which in the event of a collision prevents an undesired twisting of the steering spindle 2.

The blocking device 8 includes an oval housing 9 having a bottom plate 10 and a peripheral wall 11. At least a major portion of the housing 9 is enclosed by the stator 7. The housing 9 is attached to the stator by way of attachment flanges 12 and 13 and, in particular, with a screw connection 16, 17, which is prestressed by a spring 14, 15.

An internal toothing 19 is formed in an inner wall region 18 of the housing 9 that faces the steering spindle section 3. The internal toothing 19 may engage with a toothed ring 20, mounted on the steering spindle section 3.

In addition, a blocking element 21 is housed inside the housing 9. The concave face side 22 (which faces the steering spindle section 3) of this blocking element is also provided with an internal toothing 23. This internal toothing 23 may engage, like the internal toothing 19 of the inner wall region 18, with the toothed ring 20.

In addition, the blocking element 21 is mounted inside the housing 9 in such a manner that it can be displaced. In the housing interior 24, which remains free and is situated on the back adjacent to the blocking element 21, a signal, which is produced by a suitable device in the event of an impending collision or following a collision, generates overpressure by way of a gas pressure, which is produced by pyrotechnical devices, or compressed air of a compressed air storage. This overpressure pushes, according to the direction of the arrow A, the blocking element 21 against the steering spindle section 3 and causes the internal toothing 23 to engage with the toothed ring 20. At the same time, the housing 9 is also moved in the direction of the arrow B against the biasing force of the springs 14, 15, so that the internal toothing 19 engages with the toothed ring 20.

As a result, the steering spindle section 3 is clamped between the blocking element 21 and the housing 9, so that the steering spindle 2 cannot exert any rotational movement in accordance with the direction of the arrow D. After the driver has submerged into the unfolded airbag, the gas or air pressure may be vented again in a defined manner from the interior 24. The blocking element 21 and the housing 9 will thus release the steering spindle 2. This has the advantage that following a minor crash the vehicle can still be steered. Another advantage is that, on misfiring, the steering is blocked only a fraction of a second and may assume again immediately its function.

Figure 2:
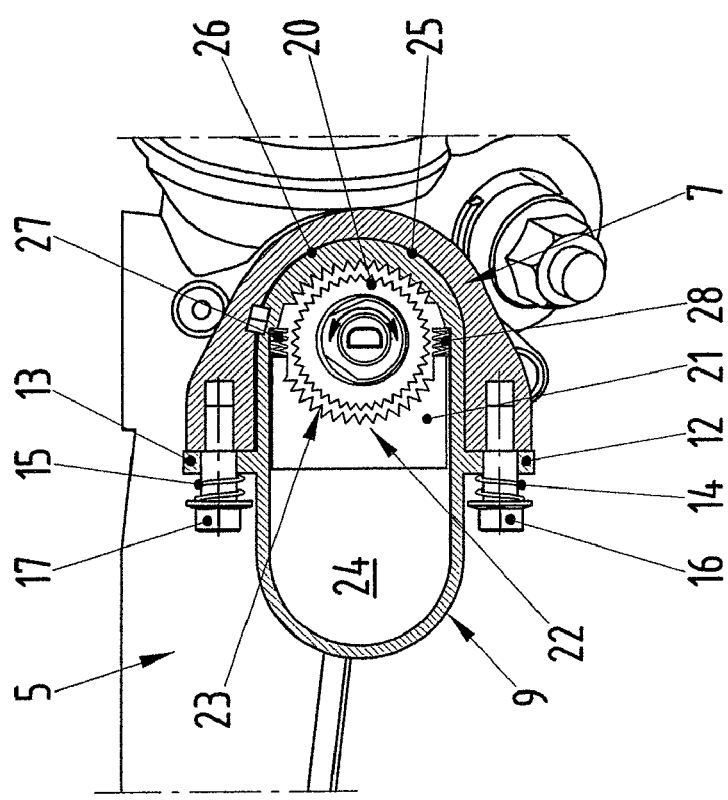
FIG. 2 is a cross sectional view of a blocking device, according to FIG. 1, in an unlocked position.

FIG. 2 is a cross sectional view of the inventive blocking device in a non-loaded position—thus, in a normal position. In this normal position, the housing 9 with its outer wall 25, facing the stator 7, is under the prestress of the springs 14 and 15 in engagement with the slot wall 26 of the stator 7, the slot wall being provided for the housing 9. The teeth of the internal toothing 19 are not in engagement with the teeth of the toothed ring 20. Since no pressure acts on the interior 24, the blocking element 21 is also located in its normal position. The teeth of the toothing 23 are not in engagement with the teeth of the toothed ring 20. Between the blocking element 21 and the housing 9, there are springs 27 and 28, which prestress the blocking element 21 in the normal position.

Figure 3:
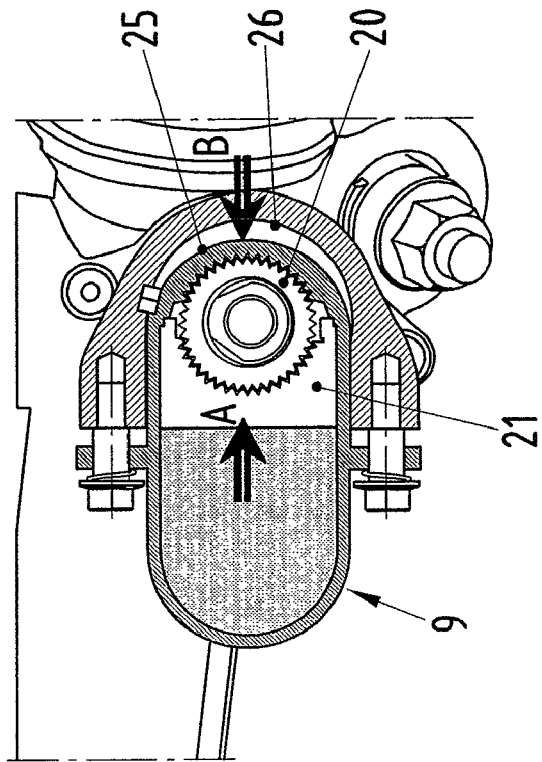
FIG. 3 is a cross sectional view of a blocking device, according to FIG. 1, in a locked position.

In contrast, FIG. 3 is a drawing of the blocking element 8 after it has been activated. In this case, the toothing 23 of the blocking element 21, as well as the internal toothing 19 of the housing 9, engage with the toothed ring 20 of the steering spindle section 3. At the same time, the relative movement of the blocking element 21 takes place against the spring force of the springs 27 and 28. The relative movement of the housing 9 takes place against the spring force of the springs 14 and 15.

In the event of a misfire, the gas or air pressure may escape in a defined manner from the interior 24, so that the blocking element may be automatically reset due to the biasing force of the springs 27 and 28; and the housing may be automatically reset due to the spring force of the springs 14 and 15.

Since the inventive blocking device may be employed wherever there is a stator, which is stationary in relation to the rotational movement of the steering spindle, the blocking device may be used in a variety of applications.

Thus, for example, FIG. 4 depicts an arrangement of the blocking device 8 in the steering spindle housing 6 (respective stator 7).

FIG. 5 shows that the blocking device 8 may also be provided at the bracket 29 of the steering column arrangement 1.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering column arrangement for a motor vehicle for locking a steering column in response to a collision, comprising:
   a steering spindle rotatable about its longitudinal axis and serving to transfer a torque generated by a steering wheel to a steering gear;
   a blocking device for preventing rotational movement of the steering spindle about the longitudinal axis, the blocking device comprising: a stator arranged stationary so that the steering spindle is rotatable relative to the stator, a blocking element being mounted for movement relative to the stator toward and away from the steering spindle and means for generating a prestress for continuously biasing the blocking element away from the steering spindle; and
   means for generating an overpressure adjacent the blocking element for moving the blocking element relative to the stator against forces exerted by the means for generating a prestress and into a locked position on the steering spindle.

2. The steering column arrangement according to claim 1, wherein, in the locked position, the blocking element interacts with the steering spindle in a shape-locked manner.

3. The steering column arrangement according to claim 1, wherein, in the locked position, the blocking element interacts with the steering spindle in a friction-locked manner.

4. The steering column arrangement according to claim 1, wherein the blocking device further comprises a housing, the housing being operatively attached in a relatively movable manner to the stator, the housing being movable relative to the stator toward and away from the steering spindle, the means for generating a prestress comprising at least one spring being disposed for urging the housing away from the steering spindle, the means for generating an overpressure further being operable for moving the housing against the force exerted by the means for generating a prestress and into the locked position on the steering spindle.

5. The steering column arrangement according to claim 2, wherein the blocking device further comprises a housing, the housing being operatively attached in a relatively movable manner to the stator, the housing being movable relative to the stator toward and away from the steering spindle, the means for generating a prestress comprising at least one spring being disposed for urging the housing away from the steering spindle, means for generating an overpressure further being operable for moving the housing against the force exerted by the means for generating a prestress and into the locked position on the steering spindle.

6. The steering column arrangement according to claim 3, wherein the blocking device further comprises a housing, the housing being operatively attached in a relatively movable manner to the stator, the housing being movable relative to the stator toward and away from the steering spindle, the means for generating a prestress comprising at least one spring being disposed for urging the housing away from the steering spindle, the means for generating an overpressure further being operable for moving the housing against the force exerted by the means for generating a prestress and into the locked position on the steering spindle.

7. The steering column arrangement according to claim 4, wherein the blocking element is mounted in a displaceable manner in the housing.

8. The steering column arrangement according to claim 7, wherein displacement of the blocking element to interact with the steering spindle in the locked position occurs via the over pressure provided in an interior of the housing adjacent the blocking element on a side facing away from the steering spindle.

9. The steering column arrangement according to claim 8, wherein on a face side of the blocking element facing the steering spindle, an internal toothing is provided, the internal toothing engaging with a toothed ring of the steering spindle in the locked position.

10. The steering column arrangement according to claim 9, wherein an inner wall region of the housing facing the steering spindle has an internal toothing, the housing internal toothing engaging with a toothed ring of the steering spindle in the locked position.

11. The steering column arrangement according to claim 1, further comprising means for generating a signal in anticipation of the collision or following the collision, the means for generating a signal activating the means for generating an overpressure.

12. The steering column arrangement according to claim 2, further comprising means for generating a signal in anticipation of the collision or following the collision, the means for generating a signal activating the means for generating an overpressure.

13. The steering column arrangement according to claim 3, further comprising means for generating a signal in anticipation of the collision or following the collision, the means for generating a signal activating the means for generating an overpressure.

14. The steering column arrangement according to claim 9, further comprising means for generating a signal in anticipation of the collision or following the collision, the means for generating a signal activating the means for generating an overpressure.

15. The steering column arrangement according to claim 10, further comprising means for generating a signal in anticipation of the collision or following the collision, the means for generating a signal activating the means for generating an overpressure.

* * * * *